(12) United States Patent
Gasser et al.

(10) Patent No.: US 8,974,202 B2
(45) Date of Patent: Mar. 10, 2015

(54) DEVICE FOR PROCESSING AN EDIBLE PRODUCT

(75) Inventors: Heinz Gasser, Züberwangen (CH); Günter Schenk, Windbeck-langenberg (DE); Michael Paul, Bergneustadt (DE)

(73) Assignee: Bühler AG, Uzwil (CH)

( * ) Notice: Subject to any disclaimer, the term of this patent is extended or adjusted under 35 U.S.C. 154(b) by 912 days.

(21) Appl. No.: 11/919,022

(22) PCT Filed: Feb. 6, 2006

(86) PCT No.: PCT/CH2006/000074
§ 371 (c)(1),
(2), (4) Date: Nov. 2, 2007

(87) PCT Pub. No.: WO2006/111033
PCT Pub. Date: Oct. 26, 2006

(65) Prior Publication Data
US 2008/0307979 A1     Dec. 18, 2008

(30) Foreign Application Priority Data
Apr. 20, 2005   (DE) .......................... 10 2005 018 503

(51) Int. Cl.
| A23L 1/48 | (2006.01) |
| A23G 1/00 | (2006.01) |
| A23G 1/20 | (2006.01) |
| A23G 7/00 | (2006.01) |
| A23G 9/28 | (2006.01) |

(52) U.S. Cl.
CPC .............. *A23G 1/0066* (2013.01); *A23G 1/206* (2013.01); *A23G 7/00* (2013.01); *A23G 9/28* (2013.01)

USPC ............................ 417/521; 417/415; 222/361

(58) Field of Classification Search
CPC ........ A23G 1/0066; A23G 7/00; A23G 1/206
USPC ............. 99/486; 222/367, 425; 417/521, 415, 417/462
See application file for complete search history.

(56) References Cited

U.S. PATENT DOCUMENTS
6,733,256 B1 *   5/2004   Knobel ......................... 417/521

FOREIGN PATENT DOCUMENTS
| EP | 0455477 A2 | 6/1991 |
| WO | 03107269 A1 | 12/2003 |
| WO | WO 2004026037 A1 * | 4/2004 |

* cited by examiner

*Primary Examiner* — Jianying Atkisson
(74) *Attorney, Agent, or Firm* — Wolff & Samson PC

(57) ABSTRACT

The invention relates to a device for processing an edible product in the form of a viscous to pasty mass, in particular, an edible product based on a fatty mass, such as chocolate, or based on water, such as ice cream. Said device comprises dosing units (D1, D2) for the dosed supply of a specific volume of the mass to a bearing surface. Said dosing units (D1, D2) comprise, respectively, a dosing piston (4) which is mounted in a piston chamber, whereby the dosing piston (4) moves at least in a rotational manner about the piston axis thereof (A1). A first plurality of dosing units (D1) are arranged on a first plane, and a second plurality of dosing units (D2) are arranged on a second plane. The dosing piston (4) of the dosing units (D1), which are arranged on the first plane (D1), are rotationally driven by means of a first drive element (7; 16), and the dosing piston (4) of the dosing units (D2), which are arranged on the second plane, are rotationally driven by means of a second drive element (8; 16).

23 Claims, 3 Drawing Sheets

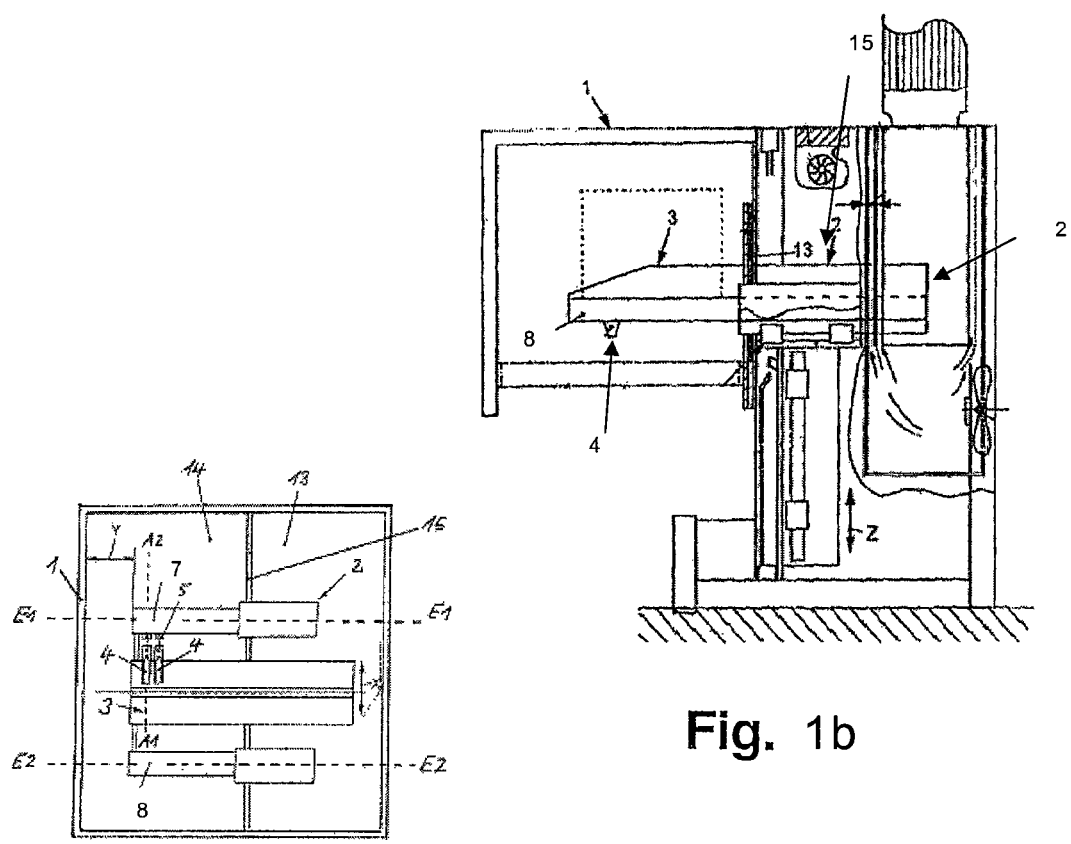
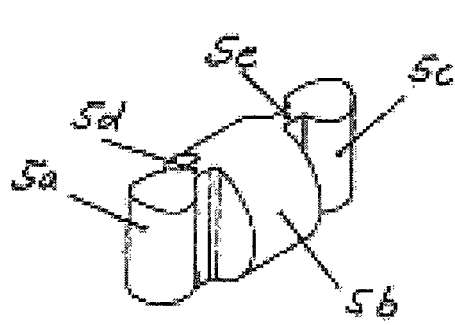
Fig. 1a
Fig. 1b
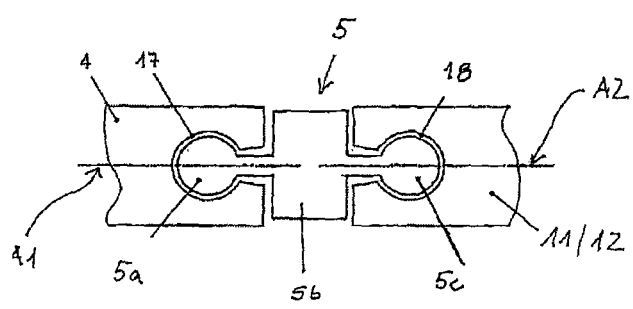
Fig. 4a
Fig. 4b

DEVICE FOR PROCESSING AN EDIBLE PRODUCT

This is a U.S. national stage of application No. PCT/CH 2006/000074, filed on Feb. 6, 2006. Priority is claimed on that application and on the following application:
Country: Germany, Application No.: 10 2005 018 503.7
Filed: Apr. 20, 2005

BACKGROUND OF THE INVENTION

The invention relates to a device or casting machine for processing a consumable in the form of a viscous to pasty mass, in particular a fat-based consumable like chocolate, or a water-based consumable like ice cream. This device contains metering units for the metered supply of a specific volume of the mass to a supporting surface, wherein the metering units each exhibit a metering piston housed in a piston chamber, the metering motion of which consists at least of a rotating motion of the metering piston around its piston axis. A first plurality of metering units is arranged in a first plane, while a second plurality of metering units is arranged in a second plane.

SUMMARY AND DESCRIPTION OF THE INVENTION

The object of the invention is to enable as uniform an introduction of driving power into each metering unit as possible in such a device or casting machine.

The object is achieved by rotationally driving the metering pistons of the metering units arranged in the first plane via a first driving element, and rotationally driving the metering pistons of the metering units arranged in the second plane via a second driving element. In this way, each metering unit receives the driving energy necessary for rotating the metering piston directly from a driving element.

The metering pistons of the metering units are preferably connected in a torsion-resistant manner with a toothed gear, the rotational axis of which is collinear with the rotational axis of the respective rotating piston, wherein the first driving element is a first toothed rack, the teeth of which mesh with the toothed gears of the metering piston arranged in the first plane, and wherein the second driving element is a second toothed rack, the teeth of which mesh with the toothed gears of the metering piston arranged in the second plane.

These two toothed racks enable an operation in which the two toothed racks each move opposite each other. As a result of this operating mode, the reaction forces and reaction torques brought about by the toothed rack movements largely cancel each other out. This helps bring about a quiet, low-vibration operation of the casting machine. For this type of design and operation, it makes sense for the first toothed rack to exhibit a first linear drive, and the second toothed rack to exhibit a second linear drive.

In an alternative embodiment, the first toothed rack and second toothed rack are rigidly connected, and have a shared linear drive. The two toothed racks and the area connecting them preferably represent a one-piece frame-like structure, which enevelops the toothed gears of the metering pistons of both planes, wherein the teeth of the toothed racks are arranged on the two long, opposing interior sides of the frame-like structure, and mesh with the toothed gears arranged in the first plane or the toothed gears arranged in the second plane.

In another alternative embodiment, the frame-like structure exhibiting the two toothed racks is replaced by a continuous toothed belt, which is slung around the toothed gears of the first plane and second plane, and provided with teeth at least on its interior side facing the toothed gears.

In this alternative embodiment, use is preferably made of a continuous toothed belt with teeth on both sides, which is meanderingly slung around the toothed gears of the first plane and second plane, i.e., alternates between an upper and lower toothed gear along the plane. Such a toothed belt drive is quiet, and can compensate for expansion triggered by In order to connect a metering piston with a toothed gear in a torsion-resistant manner, a rotating coupling element is preferably arranged between a respective metering piston and a respective toothed gear. This makes it easy to assemble and disassemble the machine, wherein the metering unit can be easily "shut down" in particular given a problem with one of the metering units by removing the rotating coupling element allocated to this metering unit. In addition, such a rotating coupling element can utilize the slight clearance of the coupling to compensate for differing expansions between the relatively cold driving area of the casting machine, which accommodates the toothed gears and toothed racks, and the relatively warm metering area of the casting machine, which incorporates the metering pistons housed in the piston chambers. The driving area is designed as a driving beam, for example, which contains the elements necessary for driving the metering units. The metering area is designed as a metering beam, for example, which incorporates the metering pistons. The mounted metering pistons can preferably execute a rotating motion around their longitudinal axis, as well as a linear motion along their longitudinal axis. temperature changes in various areas of the casting machine.

In an alternative embodiment, the metering pistons are each designed as a single piece with a respective toothed gear. In this case, suitable measures are taken to adjust the operating temperatures of the driving area and the metering area to each other. In addition or as an alternative to this temperature adjustment, a toothed belt can be used as the driving element in place of the toothed racks here as well, as described further above.

Pneumatic servo drives are best used as the linear drive for the two toothed racks or the two interconnected toothed gears (frame structure). However, hydraulic drives or electric servo drives can also be used. A pneumatic cylinder rigidly connected with a toothed rack is preferably used as the drive for imparting the rotational motion to the metering piston.

The rotating coupling element described further above preferably has a middle section, along with a first end section and a second end section, and exhibits a narrowing between the first end section and the middle section, as well as between the second end section and the middle section. When coupled in a torsion-resistant manner, the first end section is here inserted into a recess complementary thereto on an axial end of the metering piston, and the second end section is inserted into a recess complementary thereto on an axial end of the toothed gear. This coupling element can preferably be removed from the complementary recesses by moving perpendicular to the rotational axis of the metering piston or perpendicular to the rotational axis of the toothed gear. This makes it particularly easy to assemble and disassemble the casting machine, as well as to decouple the metering piston of a metering unit from the toothed gear of the driving area allocated thereto.

The inserted end sections of the coupling element and the recesses preferably have a clearance between them that permits an adjustment between the rotational axis of the metering piston and the rotational axis of the toothed gear transverse to the axial directions. This slight clearance for the coupling makes it possible to compensate particularly well for the varying expansions between the relatively cold driving area of the casting machine and the relatively warm metering area of the casting machine.

In the torsion-resistant coupling state, each inserted coupling element has a dropout safeguard that prevents the coupling element from falling out of the unit comprised of the metering piston, coupling element and toothed gear owing to gravity with this unit in a specific rotational setting.

The supporting surface of the casting machine according to the invention can be the interior surface of a mold into which the mass is metered, in order to manufacture consumables of a specific shape.

A separating wall is best provided between the driving space, which contains the power sources for the varying drives of the casting machine, and the product space in which the consumables are manufactured. This wall protects the driving space against contaminants stemming from the masses processed into the consumable article on the one hand, and serves as heat insulation between the product space and driving space.

The metering units with the respective piston chamber and metering piston accommodated therein are best arranged with their longitudinal or rotational axis aligned parallel to each other. The metering units of the first plane and metering units of the second plane are then preferably offset relative to each other perpendicular to the parallel longitudinal axes or rotational axes. This enables a very compact structural shape of the casting machine according to the invention.

BRIEF DESCRIPTION OF THE DRAWINGS

Additional advantages, features and possible applications of the device according to the invention may now be gleaned from the following description of an embodiment according to the drawing, which is not to be construed as limiting, wherein:

FIG. 1a is a top view of an open device according to the invention, FIG. 1b is a side view of an open device according to the invention;

FIG. 4 is a perspective view of the element of the device according to the invention.

DETAILED DESCRIPTION OF THE INVENTION

Figure 2:
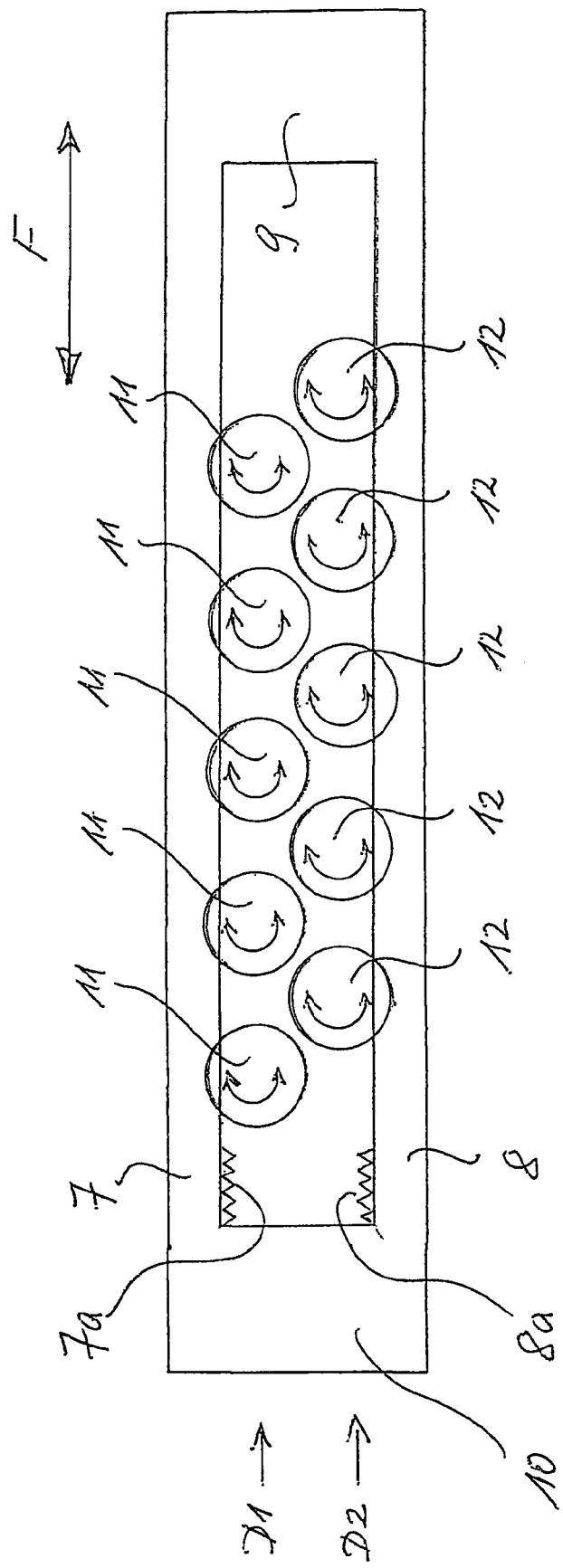
FIG. 2 is a side view along section E1-E1 or along section E2-E2 of FIG. 1, which shows a first embodiment of the device according to the invention.

A top view of the interior space of a device or casting machine according to the invention is shown diagrammatically in FIG. 1. A machine frame 1 accommodates a respective driving beam 2, 6 on either side of a metering beam 3. The driving beam 2 and the metering beam 3 can be moved in a horizontal plane along the X direction and along the Y direction by drives (not shown). The metering beam 3 incorporates several mutually parallel metering pistons 4 that are each joined by a coupling piece 5 with one of the several toothed gears 11, which are accommodated in the driving beam 2 and driven therein. Therefore, the metering beam 3 has a plurality of metering units D, which are each formed by a metering piston 4, a coupling piece 5 and a toothed gear 11. The metering units D are preferably arranged in a first plane or a first level, as well as in a second plane or a second level, wherein the metering units D of the upper plane and the metering units of the lower plane are each driven by a separate driving element 7 and 8 (see FIG. 2 ).

FIG. 1 also shows a separating wall 15, which separates the driving space 13 from the product space 14 of the device. The wall 15 protects the driving space 13 against contaminants introduced by the mass to be processed into a consumable article, and forms and insulation between the product space 14 and the driving space 13.

A diagrammatic view of a first embodiment of the driving elements of the metering units is shown on FIG. 2. A first or upper toothed rack 7 meshes with the toothed gears 11 of the metering units D 1 arranged in the first or upper plane, while a second or lower toothed rack 8 meshes with the toothed gears 12 of the metering units D 2 arranged in the second or lower plane. The upper toothed rack 7 and lower toothed rack 8 are rigidly joined via a first connecting area 9 and a second connecting area 10 at the respective end of the two toothed racks 7, 8, and are moved back and forth by driving elements (not shown) in the directions denoted by the double arrow F. The tooth systems 7a, and 8b of the toothed racks 7 and 8 are only denoted in a partial area of the toothed rack. The teeth and of the toothed gears and are only denoted for the first toothed gear of the upper or lower plane. The toothed racks 7 and 8 in conjunction with the connecting areas 9 and 10 form a drive frame that envelops the two planes of the metering units, and has teeth 7a and 8a on its interior that mesh with the toothed gears 11 and 12 of the two planes.

Figure 3:
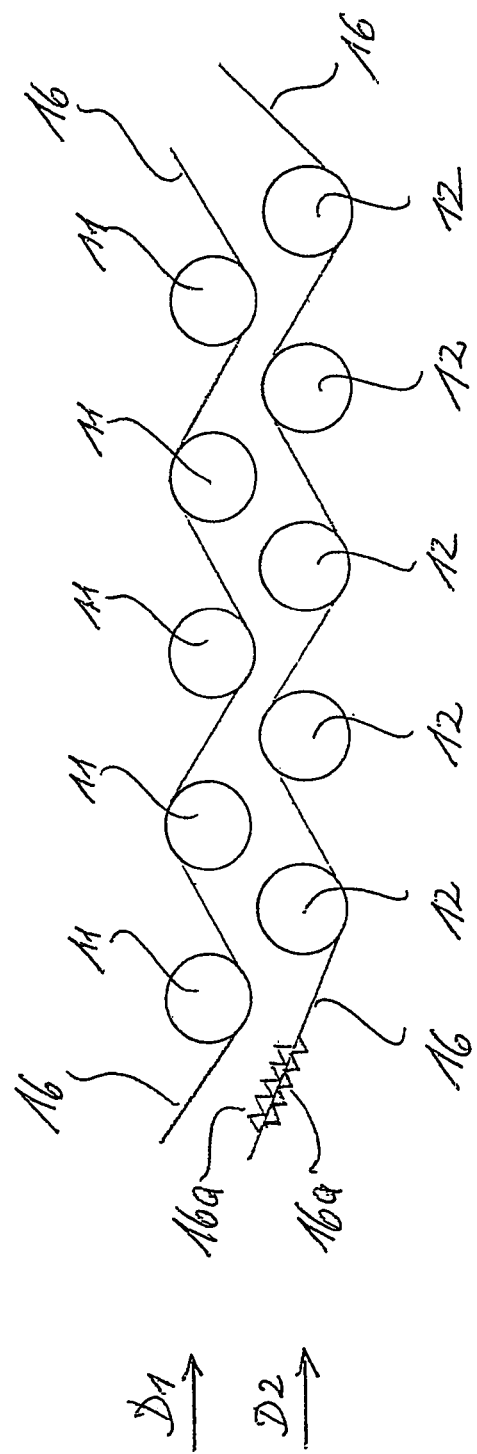
FIG. 3 is a sectional view along section E1-E1 or along section E2-E2 of FIG. 1, which shows a second embodiment of the device according to the invention.

A diagrammatic view of a second embodiment of the driving elements of the metering units D is shown in FIG. 3. The toothed gears 11 and 12 of the upper and lower plane mesh with a toothed belt 16 bearing teeth on both sides, which meanders or zigzags around the toothed gears 11 and 12, and is driven by a driving element (not shown) that moves the toothed belt 16 back and forth. The bilateral toothing 16a is only denoted in a partial area of the toothed belt 16.

The rotating piston 4 has a recess. If this metering piston 4 is driven back and forth around its axis A1 via the toothed gear drive 11, 12 or the toothed belt drive 16, a portion of a metering cycle is performed. Another segment of this metering cycle is an axial back and forth movement of the metering piston 4 along its axis A1 via additional driving means (not shown).

FIG. 4 shows a coupling piece 6 used to establish a torsion-resistant connection between a rotating piston 4 and a toothed gear 11, 12. The coupling piece 5 has a first end section 5a, a middle section 5b, a second end section 5c as well as a first narrowing 5d, which is formed between the first end section 5a and the middle section 5b, and a second narrowing 5e, which is formed between the second end section 5c and the middle section 5b.

In the torsion-resistant state, the first end section 5a is inserted into a complementary recess at an axial end of the metering piston 4, while the second end section 5c is inserted into a complementary recess at an axial end or the toothed gear 11, 12. The coupling element can be removed from the complementary recesses by moving perpendicular to the rotational axis A1 of the metering piston 4 or perpendicular to the rotational axis A2 of the toothed gear 11, 12. A respective clearance is present between the inserted end sections 5a, 5c of the coupling element 5 and the recesses in the rotating piston 4 and the toothed gears 11, 12. This enables an adjustment between the rotational axis A1 of a metering piston 4 and the rotational axis A2 of a toothed gear 11,12 transverse to the axial directions of the axes A1 and A2. The coupling element 5 is designed as a cardanic joint, which makes it possible to adjust the axes A1 and A2 transverse to the axial directions without adjusting the axes A1 and A2 along the axial direction. The coupling between a rotating piston 4 and a toothed gear created by the coupling piece 5 is preferably not just free of axial clearance, but also free of rotating clearance. As a result, thermally induced adjustments between the axes A1 and A2 do not adversely affect the metering accuracy of the metering units D, which is based on the adjustment stroke of a metering piston 4.

Each of the inserted coupling elements 5 is secured by a dropout guard with the torsion-resistant coupling of the metering piston 4 and toothed gear 11, 12 built in. This dropout guard consists of elastic caps that press against the coupling piece 5, and are detachably secured to the metering unit D, e.g., by means of a latch or clip that can be attached to the metering piston end.

The invention claimed is:

1. A device for processing a consumable in the form of a viscous to pasty mass, comprising:
   metering units for metering a specific volume of mass onto a supporting surface, the metering units each having a metering piston incorporated in a piston chamber, the metering piston having a metering motion that exhibits at least one rotational motion of the metering piston around its piston axis, wherein a first plurality of the metering units is arranged in a first plane, and a second plurality of the metering units is arranged in a second plane;
   one first driving element, said first driving element being a rack or a belt, for rotationally driving a plurality of metering pistons of the first plurality of the metering units arranged in the first plane; and
   one second driving element, said second driving element being a rack or a belt, for rotationally driving a plurality of metering pistons of the second plurality of the metering units arranged in the second plane, such that each metering unit receives the driving energy necessary for rotating the metering piston directly from a driving element and wherein a plurality of metering pistons of the metering units arranged in the first plane are rotationally driven by said first driving element and a plurality of metering pistons of the metering units arranged in the second plane are rotationally driven by said second driving element.

2. The device according to claim 1, wherein the supporting surface is an interior surface of a mold.

3. The device according to claim 1, and further comprising a frame having a separating wall defining a driving space and a product space within the frame.

4. The device according to claim 1, wherein the metering units with the respective piston chamber and the metering piston accommodated therein are arranged with mutually parallel longitudinal axes or rotational axes.

5. The device according to claim 4, wherein the metering units of the first plane and the metering units of the second plane are arranged offset relative to each other perpendicular to the parallel longitudinal axes of rotational axes.

6. The device according to claim 1, wherein each of the metering pistons is connected in a torsion-resistant manner with a toothed gear having a rotational axis which is collinear with a rotational axis of the respective rotating piston, wherein the first driving element is a first toothed rack having teeth that mesh with the toothed gears of the metering pistons arranged in the first plane, and wherein the second driving element is a second toothed rack having teeth that mesh with the toothed gears of the metering pistons arranged in the second plane.

7. The device according to claim 6, wherein the first toothed rack and the second toothed rack are rigidly connected via at least one connection area and have a shared linear drive.

8. The device according to claim 6, wherein the first toothed rack has a first linear drive, and the second toothed rack has a second linear drive.

9. The device according to claim 6, wherein a rotating coupling element is arranged between a respective metering piston and a respective toothed gear so as to connect the metering piston with the toothed gear in a torsion-resistant manner.

10. The device according to claim 6, wherein the metering pistons are each configured as a single piece with a respective one of the toothed gears.

11. The device according to claim 7, wherein the linear drive of the toothed racks is a pneumatic drive.

12. The device according to claim 8, wherein the linear drives of the toothed racks are pneumatic drives.

13. The device according to claim 11, wherein a pneumatic cylinder rigidly connected with at least a respective one of the first toothed rack or the second toothed rack is used as the drive for rotating the metering piston.

14. The device according to claim 11, wherein a pneumatic cylinder rigidly connected with a toothed rack is used as the drive for rotating the metering piston.

15. The device according to claim 9, wherein the rotating coupling element has a middle section, a first end section and a second end section, and exhibits a narrowing between the first end section and the middle section, and between the second end section and the middle section, wherein, when coupled in a torsion-resistant manner, the first end section is inserted into a recess complementary there to on an axial end of the metering piston, and the second end section is inserted into a recess complementary thereto on an axial end of the toothed gear.

16. The device according to claim 15, wherein the rotating coupling element is removable from the complementary recesses by movement perpendicular to the rotational axis of the metering piston or perpendicular to the rotational axis of the toothed gear.

17. The device according to claim 15, wherein the inserted end sections of the rotating coupling element and the recesses have a clearance between them that permits an adjustment between the rotational axis of the metering piston and the rotational axis of the toothed gear transverse to the axial directions.

18. The device according to claim 17, wherein each inserted rotating coupling element has a dropout guard in the torsion-resistant coupled state.

19. A device for processing a consumable in the form of a viscous to pasty mass, comprising:
   metering units for metering a specific volume of mass onto a supporting surface, the metering units each having a metering piston incorporated in a piston chamber, the metering piston having a metering motion that exhibits at least one rotational motion of the metering piston around its piston axis, wherein a first plurality of the metering units is arranged in a first plane, and a second plurality of the metering units is arranged in a second plane;
   a first driving element for rotationally driving the metering pistons of the metering units arranged in the first plane; and
   a second driving element for rotationally driving the metering pistons of the metering units arranged in the second plane, wherein a first tooth rack meshes who toothed gears of the metering units arranged in the first plane, while a second toothed rack meshes with toothed gears of the metering units arranged in the second plane and the first toothed rack and the second toothed rack are rigidly joined via a first connecting area and a second connecting area at the respective and the toothed racks and are moved back and forth.

20. A device for processing a consumable in the form of a viscous to pasty mass, comprising:

metering units for metering a specific volume of mass onto a supporting surface, the metering units each having a metering piston incorporated in a piston chamber, the metering piston having a metering motion that exhibits at least one rotational motion of the metering piston around its piston axis, wherein a first plurality of the metering units is arranged in a first plane, and a second plurality of the metering units is arranged in a second plane;

a first driving element for rotationally driving the metering pistons of the metering units arranged in the first plane; and a second driving element for rotationally driving the metering pistons of the metering units arranged in the second plane, wherein toothed gears of upper and lower plane meshes with a toothed belt bearing teeth on both sides, which meanders or zigzags around the toothed gears and is driven by a driving element that moves the toothed belt back and forth.

21. A device for processing a consumable in the form of a viscous to pasty mass, comprising:

metering units for metering a specific volume of mass onto a supporting surface, the metering units each having a metering piston incorporated in a piston chamber, the metering piston having a metering motion that exhibits at least one rotational motion of the metering piston around its piston axis, wherein a first plurality of the metering units is arranged in a first plane, and a second plurality of the metering units is arranged in a second plane;

one first driving element for rotationally driving all the metering pistons of the metering units arranged in the first plane; and one second driving element for rotationally driving all the metering pistons of the metering units arranged in the second plane, such that each metering unit receives the driving energy necessary for rotating the metering piston directly from a driving element, wherein each of the metering pistons is connected in a torsion-resistant manner with a toothed gear having a rotational axis which is collinear with a rotational axis of the respective rotating piston, wherein the first driving element is a first toothed rack having teeth that mesh with the toothed gears of the metering pistons arranged in the first plane, and wherein the second driving element is a second toothed rack having teeth that mesh with the toothed gears of the metering pistons arranged in the second plane, and wherein the first toothed rack and the second toothed rack are rigidly connected via at least one connection area and have a shared linear drive.

22. The device according to claim 21, wherein the linear drive of the toothed racks is a pneumatic drive.

23. The device according to claim 22, wherein a pneumatic cylinder rigidly connected with at least a respective one of the first toothed rack or the second toothed rack is used as the drive for rotating the metering piston.

* * * * *